US005129055A

United States Patent [19]

Yamazaki et al.

[11] Patent Number: 5,129,055

[45] Date of Patent: Jul. 7, 1992

[54] DISPLAY CONTROL APPARATUS INCLUDING A WINDOW DISPLAY PRIORITY DESIGNATION ARRANGEMENT

[75] Inventors: Hideki Yamazaki; Hiroshi Takeda, both of Kodaira, Japan

[73] Assignee: Hitachi, Ltd., Tokyo, Japan

[21] Appl. No.: 670,526

[22] Filed: Mar. 18, 1991

Related U.S. Application Data

[63] Continuation of Ser. No. 100,741, Sep. 24, 1987, abandoned.

[30] Foreign Application Priority Data

Sep. 24, 1986 [JP] Japan ............................ 61-223549

[51] Int. Cl.[5] ............................................ G06F 3/153
[52] U.S. Cl. .................................... 395/158; 340/723
[58] Field of Search ............... 395/158, 157, 160, 161, 395/164-166; 340/721, 723, 724

[56] References Cited

U.S. PATENT DOCUMENTS

| | | | |
|---|---|---|---|
| 4,542,376 | 9/1985 | Bass et al. | 364/521 |
| 4,559,533 | 12/1985 | Bass et al. | 340/724 |
| 4,670,752 | 6/1987 | Marcoux | 340/744 X |
| 4,675,811 | 6/1987 | Kishi et al. | 364/200 |
| 4,694,288 | 9/1987 | Harada | 340/721 |
| 4,710,761 | 12/1987 | Kapur et al. | 340/724 |
| 4,712,191 | 12/1987 | Denna | 364/521 X |
| 4,780,710 | 10/1988 | Tatsumi | 340/723 |

FOREIGN PATENT DOCUMENTS

| | | |
|---|---|---|
| 0158785 | 2/1985 | European Pat. Off. . |
| 0147542 | 7/1985 | European Pat. Off. . |
| 0172312 | 2/1986 | European Pat. Off. . |
| 0247827 | 12/1987 | European Pat. Off. . |
| 87/00329 | 1/1987 | PCT Int'l Appl. . |

OTHER PUBLICATIONS

"Nikkei Electronics", Published by Nikkei McGraw Hill Co., Jul. 14, 1986, No. 399, pp. 115-132.

*Primary Examiner*—Heather R. Herndon
*Attorney, Agent, or Firm*—Antonelli, Terry, Stout & Kraus

[57] ABSTRACT

A display control system is provided which includes window management circuits having a plurality of area setting registers for individually setting a plurality of window display areas on a display surface, and for judging sequentially for each window whether or not a display position on the display surface is contained in the area designated by the register. A window display priority designation circuit is also provided having a plurality of priority setting registers for setting display priority of each window, and for determining which window has higher priority among a plurality of windows which are determined as containing the present display position on the basis of the content of the priority setting register and the result of a determination of which windows contain the present display position made by the window management circuit.

22 Claims, 7 Drawing Sheets

DISPLAY CONTROL APPARATUS INCLUDING A WINDOW DISPLAY PRIORITY DESIGNATION ARRANGEMENT

This application is a continuation of application Ser. No. 100,741, filed on Sept. 24, 1987, now abandoned.

BACKGROUND OF THE INVENTION

This invention relates to a display control technique which is particularly effective when applied to a multi-window control system. More particularly, it relates to a technique which is effective when utilized for a display control apparatus, such as a graphic controller, for example.

In conventional graphic display systems, both software window systems and a hardware window systems have been proposed as a multi-window control system for displaying a plurality of windows on a display surface.

Among them, the hardware window system is accomplished by furnishing a display controller LSI with a multi-window control function. In the software window system, on the other hand, software executes a function called "bit block transfer" which transfers data of a rectangular region inside a frame buffer for the purpose of multi-window display. (As to multi-window control, refer to "Nikkei Electronics", published by Nikkei McGraw Hill Co., July 14, 1986, No. 399, pp. 115-132).

In the conventional multi-window control systems, the hardware system has a higher display speed but its display freedom is lower because the priority sequence of windows is fixed. On the other hand, the software system has high freedom of display surface, such as a greater number of windows, but involves the problem that the display speed is extremely low for the following reason. In the software system, data that constitute a base picture and a window picture are stored in predetermined areas of a bit map memory, respectively, and then the display surface area must be rewritten through data block transfer by transferring the data constituting the window picture to the base surface area and superposing them together.

SUMMARY OF THE INVENTION

It is therefore an object of the present invention to provide a multi-window control technique having high freedom of display, and moreover one which is capable of high speed display.

According to the present invention, there are disposed window management circuits which include a plurality of area setting registers for individually setting a plurality of window display areas on a display surface and an arrangement for judging sequentially for each of the windows whether or not the display position on the display surface is contained in the area designated by the registers. A window display priority designation circuit is also provided which includes a plurality of priority setting registers for setting display priority of each window and for determing the window having higher priority among those windows which are judged as containing the display position described above on the basis of the content of the priority setting registers and the result of judgment of the window management circuits. As to the output of the display address corresponding to the window which is judged as having higher priority, address calculation is made for each of the windows which are judged as having the display position on the basis of the result of judgment of the window management circuits, and only the result of judgment among the results of judgment which is judged has having higher priority by the window display priority designation circuit is selectively outputted to a frame buffer. Furthermore, calculation of the display address corresponding to the window which is judged as having higher priority by the window display priority designation circuit is executed selectively and the address resulting from calculation can be supplied to the frame buffer.

According to the means described above, the change of the display position and size of the window and the change of the display priority sequence at an overlap portion can be made by merely changing the set content of the area setting register and the priority setting registers, so that freedom of the display surface can be increased and multi-window control can be made at a higher speed.

DESCRIPTION OF THE PREFERRED EMBODIMENT

Figure 1:
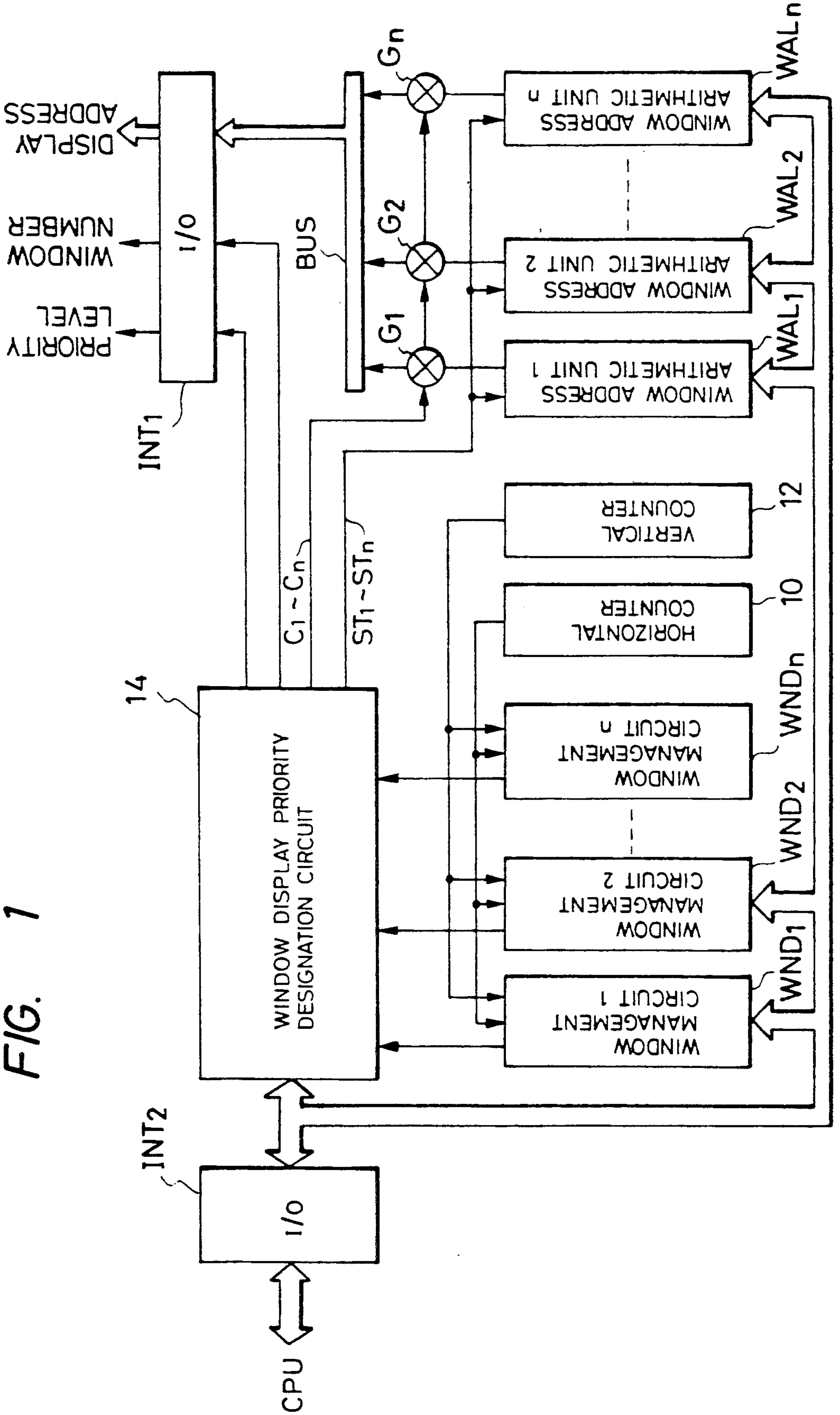
FIG. 1 is a block diagram of a display control apparatus in accordance with one embodiment of the present invention.
Figure 6:
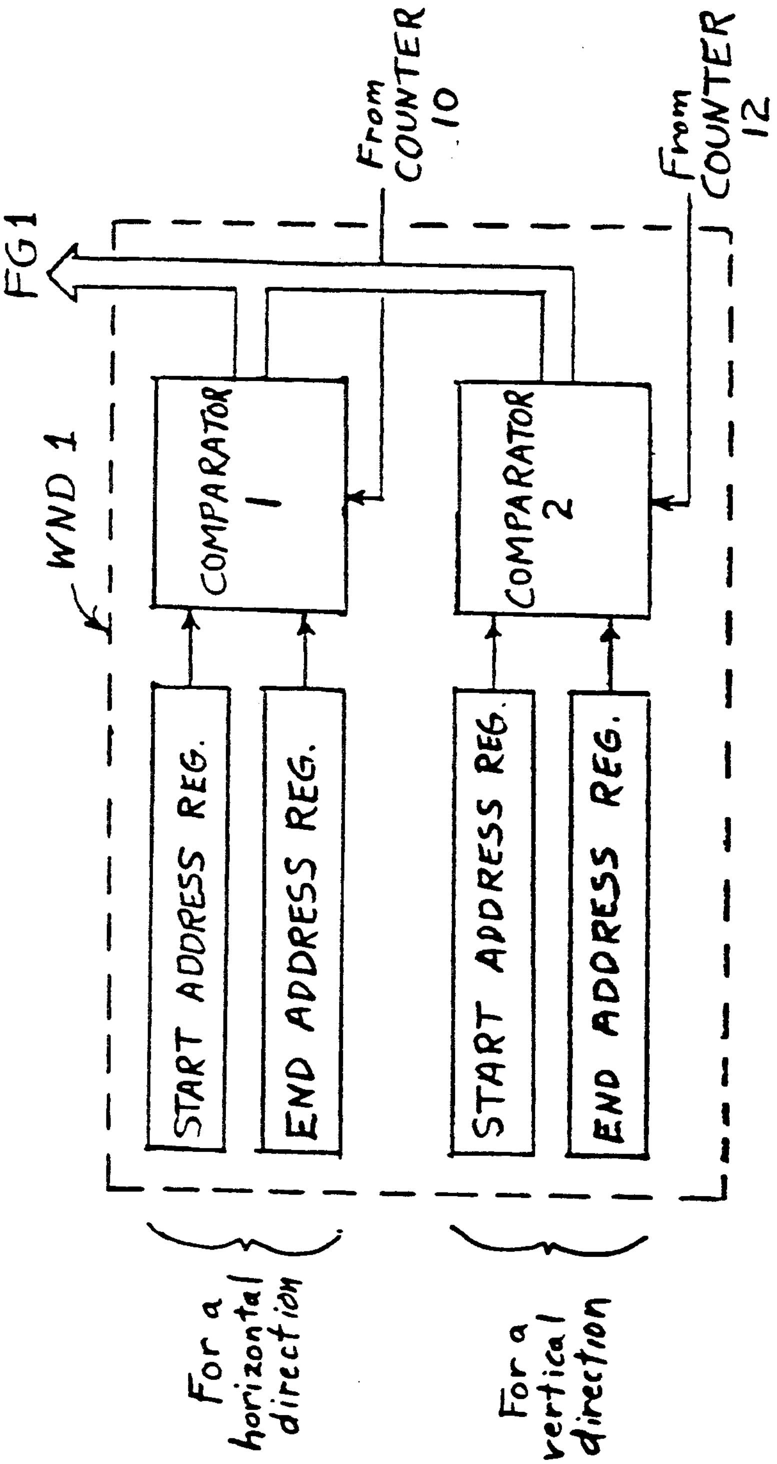
FIG. 6 is a block diagram showing an example of a window management circuit of FIG. 1.

In the display control apparatus shown in FIG. 1, n window management circuits $WND_1 \sim WND_n$ are disposed on the display surface in order to display and control n windows, though not particularly limitative. As shown in FIG. 6, each window management circuit $WND_1 \sim WND_n$ is equipped with a start address register for designating the start position on the picture surface in a horizontal direction, an end address register for designating the end position in the horizontal direction, a start address register for designating the start position in a vertical direction, an end address register for designating the end position in the vertical direction and an address comparison comparator for sequentially discriminating whether or not the display position on the display surface is contained in the window display area designated by the respective register, in order to set arbitrarily the window display area on the display surface.

Signals from a horizontal counter 10 representing the display position in the horizontal direction on the picture surface and a vertical counter 12 for representing the display position in the vertical direction are applied to each window management circuit $WND_1 \sim WND_n$. The comparator of each window management circuit compares the value of the address register with the count value supplied and when the display position falls within the window of its own and when the display position comes out from the window of its own, it outputs coincidence detection signals, respectively.

The detection signal outputted from each window management circuit $WND_1 \sim WND_n$ is supplied to a window display priority designation circuit 14 for judging the priority of which window is the highest when a plurality of windows overlap, that is, for judging the display data of which window is to be displayed. Upon receiving the detection signal for display start from each window management circuit $WND_1 \sim WND_n$, the window priority designation circuit 14 outputs a calculation start signal STi to an address arithmetic unit WALi ($i=1, 2, \ldots, n$) corresponding to the window. A priority designation register for setting the priority of each window is disposed inside the window display priority designation circuit 14, and window control is carried out in accordance with the priority that is set in advance to this register by the CPU.

In other words, even when the display start signals are applied simultaneously from a plurality of window management circuits, the window display priority designation circuit 14 outputs a control signal Ci such that it opens the output gate Gi of the address arithmetic unit WALi corresponding to the window having the highest priority among these windows. Then, the address that is outputted onto an internal bus BUS through the output gate Gi thus opened is outputted outside as the display address for making read access to the data of a predetermined window through an I/O interface circuit $INT_1$, and is supplied to a frame buffer (not shown), or the like.

Though not particularly limitative, it is possible in this embodiment to output outside a signal representing the level of priority generated by the window display priority designation circuit 14 and a window number representing to which window the display address which is being outputted belongs, together with the display address described above. Accordingly, the multi-window control system including a plurality of display control apparatuses can easily control and let an external circuit (not shown) adopt the output of the display control apparatuses, on the basis of the priority level outputted from each display control apparatus and the window number.

The following methods may be used as a method of setting priority by the priority register in the window display priority designation circuit 14. The first method prepares in advance the same number of registers as the number (n) of the windows, putting in advance the priority sequence to these registers and setting the window number into each register so as to provide each window with priority The second method disposes registers each of which corresponds to each window on the 1:1 basis and sets a code representing the priority level to each register. Each priority register is constructed such that the CPU sets in advance the window number of the priority level through an I/O Interface circuit $INT_2$ on the CPU side thereto. Incidentally, the CPU sets the display area of the window in each window management circuit $WND_1 \sim WND_n$ and the display start address and the calculation constants such as the memory width in each address arithmetic unit $WAL_1 \sim WAL_n$ through the I/O interface circuit $INT_2$.

Figure 2:
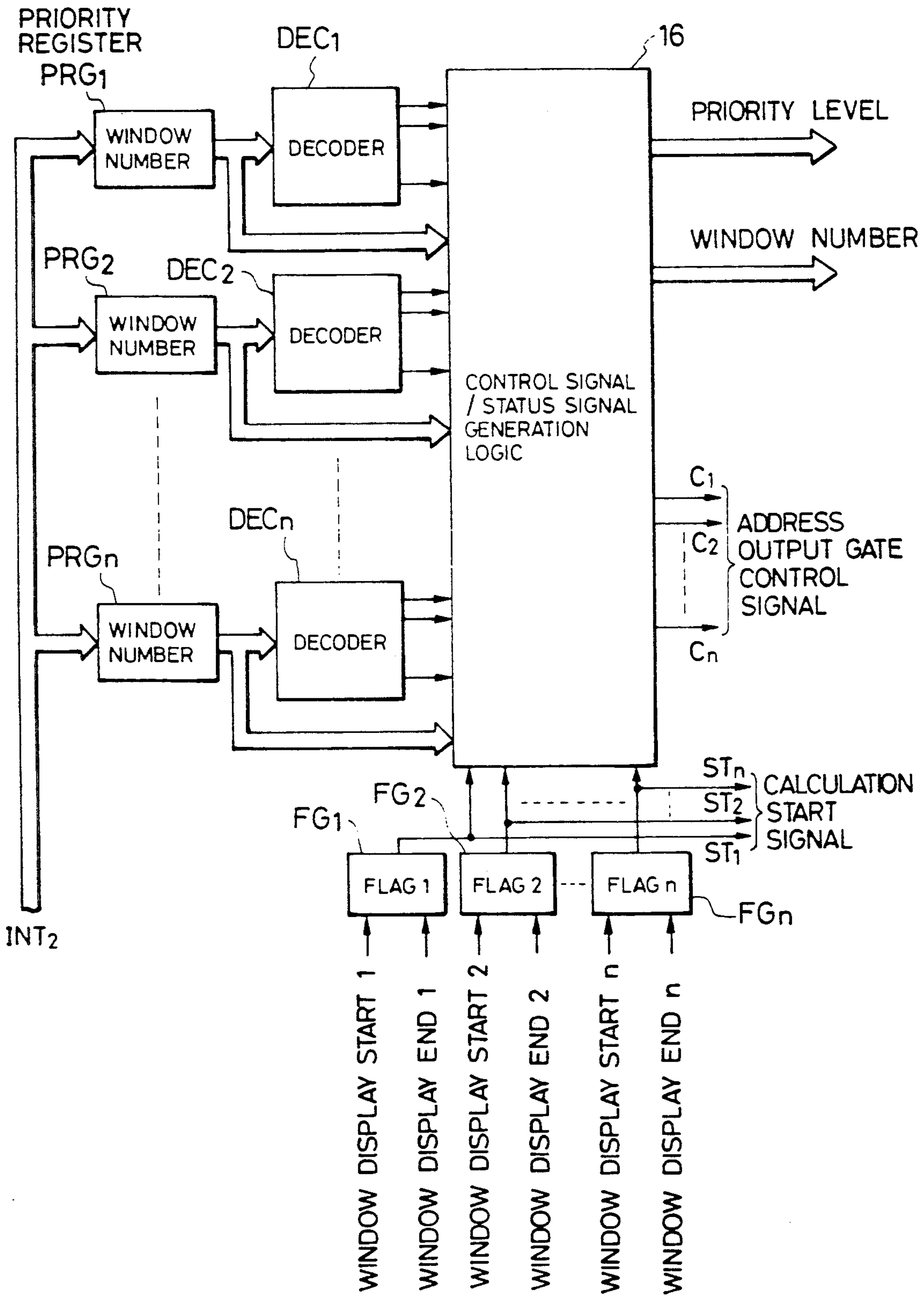
FIG. 2 is a block diagram showing an example of a window display priority designation circuit.

FIG. 2 shows an example of the construction of the window display priority designation circuit 14 employing the system which sets the window number to the registers to which the priority sequence is applied among the priority setting systems described above.

In FIG. 2, symbols $PRG_1 \sim PRG_n$ represents the priority registers to which the priority sequence is given. The window number is set in turn from the window having the highest priority into each priority register $PRG_1 \sim PRG_n$. The window number in each priority register $PRG_1 \sim PRG_n$ is decoded by the corresponding decoder $DEC_1 \sim DEC_n$ so that among the output signals of each decoder, only one signal corresponding to the window number is raised to the high level. The output signal of each decoder $DEC_1 \sim DEC_n$ is used as the control signal/input signal to the status signal generation logic 16.

On the other hand, a flag $FG_1 \sim FG_n$ consisting of a flip-flop is disposed in the window display priority designation circuit 14 in such a manner as to correspond to each window, and is set and reset by the display start signal and display end signal from each window management circuit $WND_1 \sim WND_n$. When the output of each flag is turned to the low level corresponding to the logic "0" by the display start signal for the corresponding window, each flag keeps this low level until the display end signal is applied thereto The output signals of these flags $FG_1 \sim FG_n$ are supplied as the calculation start signals $ST_1 \sim ST_n$ to the window address arithmetic units $WAL_1 \sim WAL_n$, though not limitative in particular, and while the calculation start signal remains at the low level, calculation of the display address of the corresponding window is continued. Where a plurality of windows overlap with one another, calculation of the predetermined display address is executed for each of these windows.

In the embodiment described above, the output of each flag $FG_1 \sim FG_n$ is supplied to the control signal/status signal generation logic 16 together with the output of each decoder $DEC_1 \sim DEC_n$ and used to determine which address is to be outputted as the display address among the addresses that are calculated by the address arithmetic units $WAL_1 \sim WAL_n$. In other words, the window which is being calculated is determined from the output of the flag $FG_1 \sim FG_2$, the window number having the highest priority level is determined from among the information of the priority registers $PRG_1 \sim PRG_n$ and the control signal Ci which opens the output gate Gi of the corresponding arithmetic unit is outputted. Moreover, the number of the window to which the outputted display address belongs is selectively outputted and the priority level of the window is outputted, too, on the basis of the decoder output.

Figure 3:
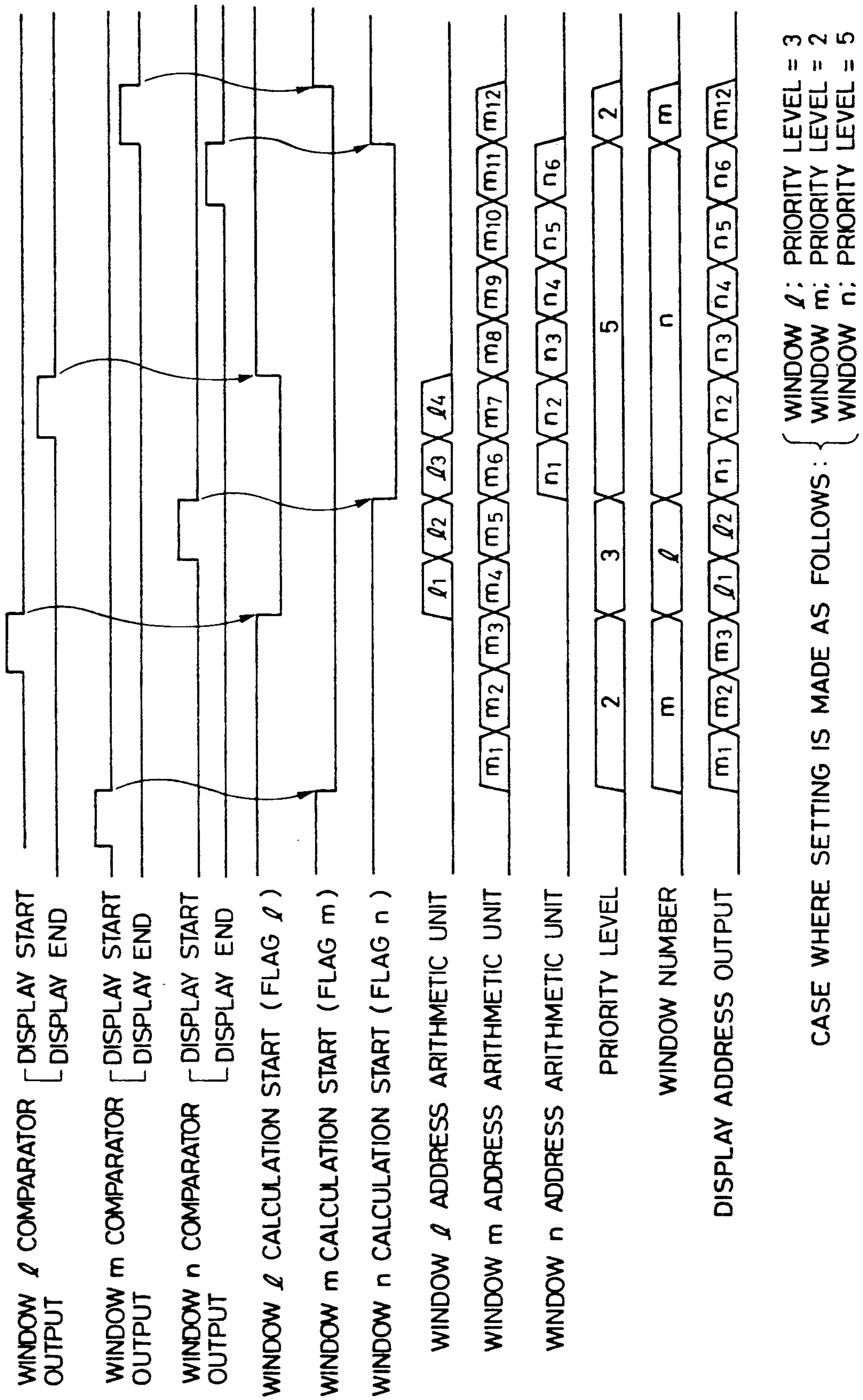
FIG. 3 is a timing chart useful for explaining the operation of multi-window display control in the display control apparatus shown in FIG. 1.

FIG. 3 shows the output state of various control signals and display addresses at the overlap portion when three windows l, m and n are prepared and set to the priority registers having the priority levels "3", "2" and "5", respectively, by ways of example (with the proviso that the greater number represents higher priority).

The flag corresponding to each window is set and reset by the output of the comparator inside each window management circuit $WND_1 \sim WND_n$. While the flag is set and its output signal is at the low level, calculation of the display address is continued in the corresponding address arithmetic unit. When calculation is made simultaneously in a plurality of arithmetic units, that is, when a plurality of windows overlap with one another, the addresses corresponding to the windows having the higher priority level (in the sequence $n>l>m$ in the embodiment) are selected and outputted as the display address.

Next, an example of a circuit construction including the decoder $DEC_1$ ~ $DEC_n$ the status signal generation logic 16 will be explained with reference to FIGS. 4(A) and 4(B).

Figure 4A:
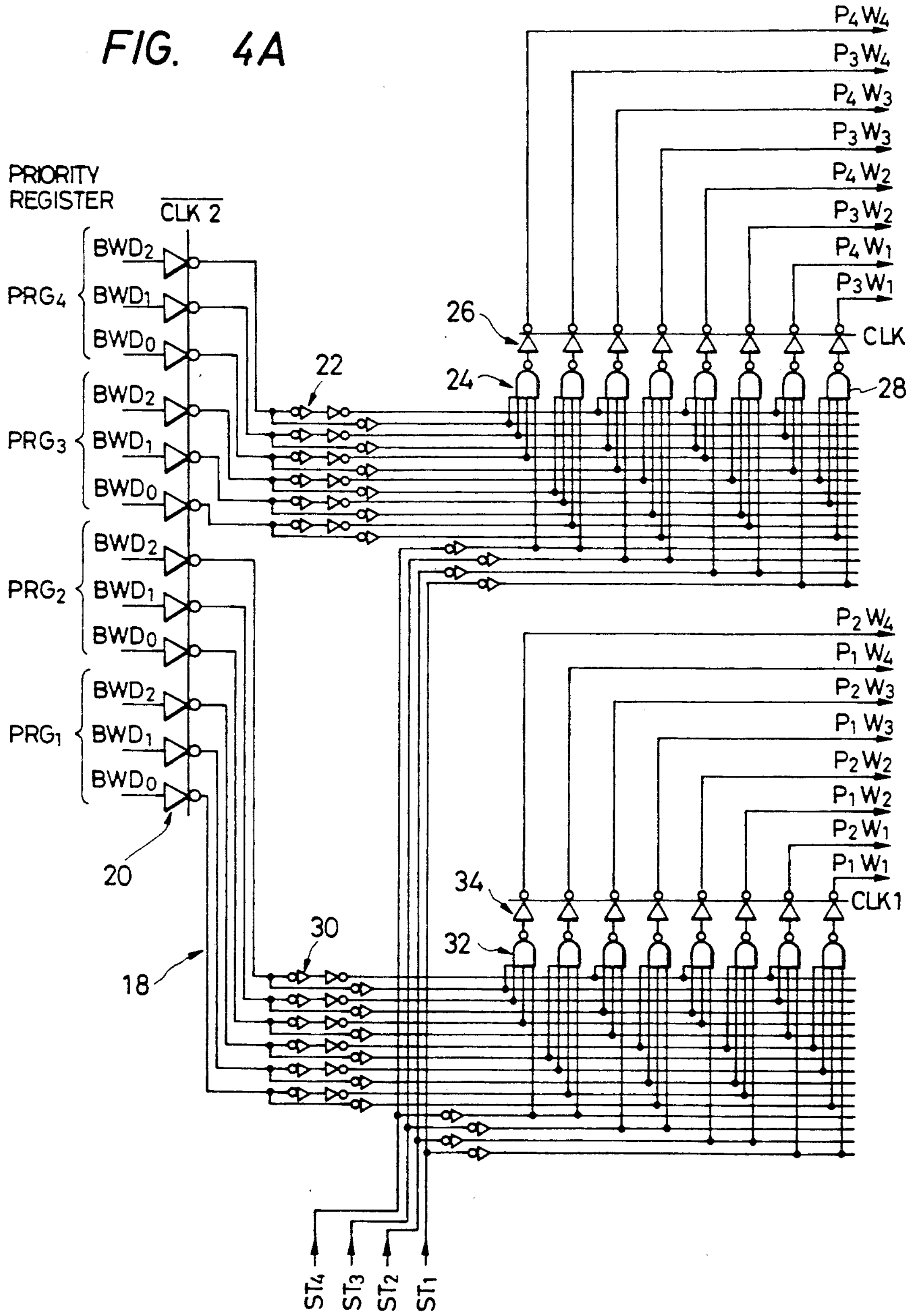
FIGS. 4A and 4B show examples of the decoder and the control signal/status signal generation logic that are shown within the dashed line area in FIG. 2.
Figure 4B:
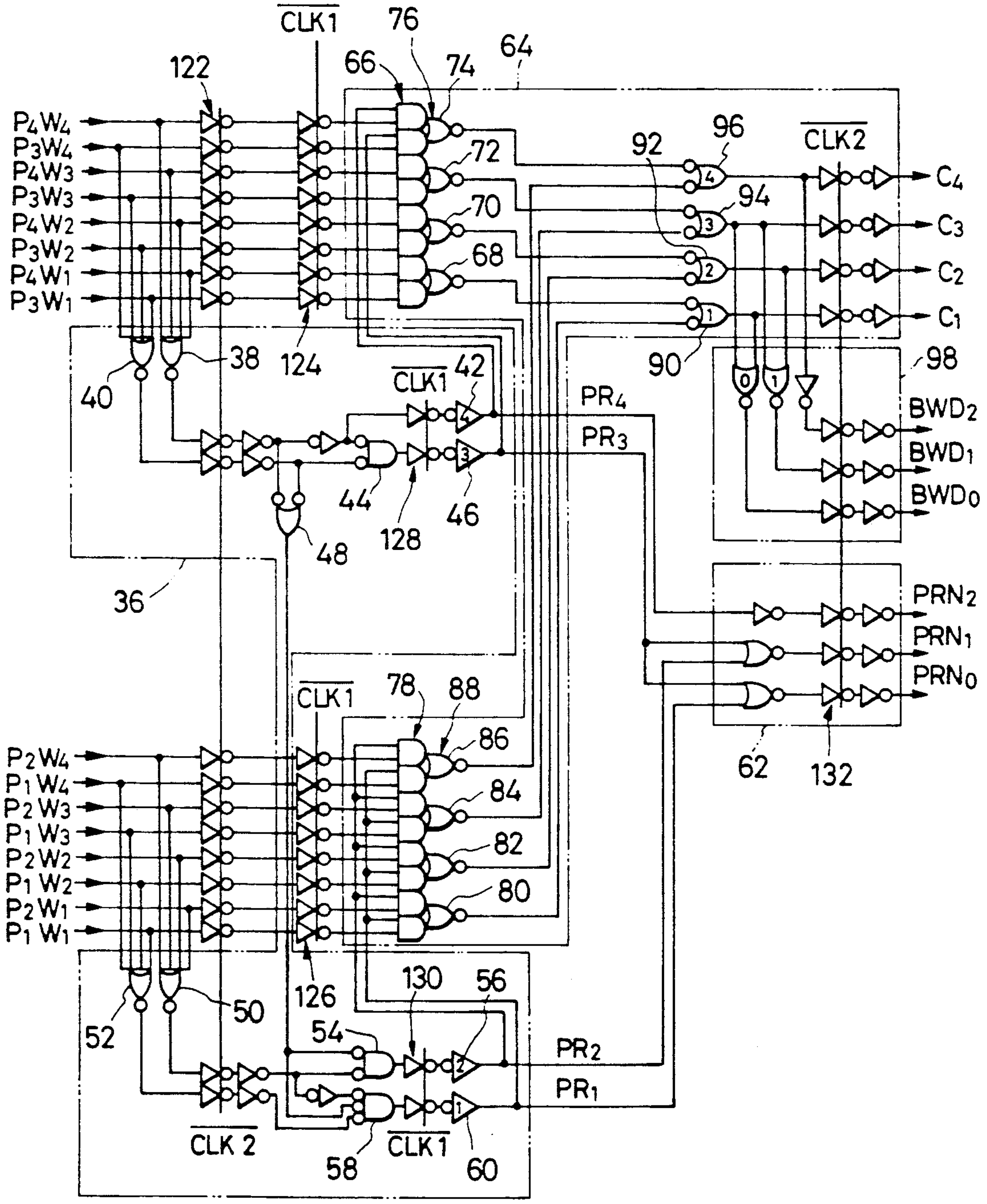

Though not particularly limitative, the circuits shown in FIGS. 4(A) and 4(B) are applied to a system which display-controls a maximum of four windows on the display surface and consist of a random logic circuit. In the description based upon FIGS. 4(A) and 4(B), 3-bit data $BWD_0$ ~ $BWD_2$ supplied from the CPU designate the window number, though this is not particularly limitative. In other words, when $BWD_0$, $BWD_1$ and $BWD_2$ are "1", "0" and "0", the state means designation of the window 1 and when they are "0", "1" and "0", the state means designation of the window 2. Furthermore, when they are "1", "1" and "0", the state means designation of the window 3 and when they are "0", "0" and "1", the state means designation of the window 4. The combinations of the bits other than those described above mean that the window display is not effected. These 3-bit data $BWD_0$, $BWD_1$ and $BWD_2$ have the combinations of codes corresponding to the window number and are set to the four priority registers $PRG_1$ to $PRG_4$, respectively. Here, the priority sequence is provided to these registers $PRG_1$ to $PRG_4$ in advance in the same way as in the aforementioned case, and the priority becomes higher progressively from $PRG_1$ to $PRG_4$. Hereinafter, the priority levels provided to these priority registers $PRG_1$ to $PRG_4$ will be called the "priority levels 1, 2, 3 and 4", respectively.

In FIG. 4(A), reference numeral 18 represents a decoder unit which obtains the relation between the window for which address calculation is made and the priority level of that window on the basis of the set data of the four priority registers $PRG_1$ ~ $PRG_4$ and the calculation start signals $ST_1$ ~ $ST_4$ described above.

In this decoder unit 18, the upper half corresponding to the priority registers $PRG_3$ and $PRG_4$ have the construction to decode the window numbers set as the priority level 3 or 4 and to decode also the window number among the window numbers for which address calculation has already been started. The decoded output signals in this upper half construction are eight kinds, i.e. $P_3W_1$, $P_4W_1$, $P_3W_2$, $P_4W_2$, $P_3W_3$, $P_4W_3$, $P_3W_4$ and $P_4W_4$. When these decoded output signals $P_mW_n$ ($m=3, 4$; $n=1, 2, 3, 4$) are at the high level, the window n is set as the priority level m and the start of address calculation for this window n is designated, though not particularly limitative. Such a decoding logic consists, though not particularly limitative, of a clocked inverter array 20 for out putting the set data of the priority registers $PRG_3$ and $PRG_4$ for each bit at fixed timing, an inverter array 22 for converting the bit data supplied from the clocked inverter array 20 to data of complementary levels, an NAND gate array 24 which receives as its four inputs the predetermined three data among the outputs of the inverter array 22 and one predetermined signal among the inversion level signals of the calculation start signals $ST_1$ to $ST_4$, and a clocked inverter array 26 for supplying the output of the NAND gate array 24 to the next stage at a predetermined timing. For example, the inversion level signal of the calculation start signal $ST_1$ corresponding to the window 1, the signal having the same level as the bit $BWD_0$ set to the respective priority register $PRG_3$, the inversion level signal of the bit $BWD_1$ and the inversion level signal of the bit $BWD_2$ are applied, for example, to the NAND gate circuit 28 generating the decoded output signal $P_3W_1$. Therefore, when all the four input signals applied to the NAND gate circuit 28 are at the high level, that is, when the window 1 is set to the priority register $PRG_3$ ($BWD_0=1$, $BWD_1=0$, $BWD_2=0$) and the calculation start signal is given to the window 1 ($ST_1=0$), the output signal of the NAND circuit 28 is at the low level and the decoded output signal $P_3W_1$ is at the high level as the active level.

The lower half of the decoding unit 18 corresponding to the priority registers $PRG_1$ and $PRG_2$ has the construction in order to decode the window numbers set as the priority level 1 or 2 and further to decode the window number among the window numbers for which the start of address calculation is designated. The lower half has the same logic construction as that of the upper half and generates the eight kinds of decoded output signals, i.e., $P_1W_1$, $P_2W_1$, $P_1W_2$, $P_2W_2$, $P_1W_3$, $P_2W_3$, $P_1W_4$ and $P_2W_4$. When these decoded output signals $P_mW_n$ ($m=1, 2$, $n=1, 2, 3, 4$) are at the high level, the window n as the priority level m is set and the start of address calculation for that window n is instructed. Such a decoding logic consists of a clocked inverter array 20 for outputting the set data of the priority registers $PRG_1$ and $PRG_2$ for each bit at a predetermined timing, an inverter array 30 for converting the bit data supplied from the clocked inverter array 20 to data of complementary levels, a NAND gate array 32 including eight NAND gate circuits which receive as its four input the predetermined three data of the outputs of the inverter array 30 and one predetermined inversion level signal among the inversion level signals of the calculation start signals $ST_1$ to $ST_4$ described above and a clocked inverter array 34 for supplying the output of the NAND gate array 32 to the next stage at a predetermined timing.

In FIG. 4(B), reference numeral 36 represents a logic unit for generating a priority level instruction signal corresponding to the priority level of the window to be displayed on the basis of the sixteen kinds of the decoded output signals $P_3W_1$, $P_4W_1$, $P_3W_2$, $P_4W_2$, $P_3W_3$, $P_4W_3$, $P_3W_4$, $P_4W_4$, $P_1W_1$, $P_2W_1$, $P_1W_2$, $P_2W_2$, $P_1W_3$, $P_2W_3$, $P_1W_4$ and $P_2w_4$.

In this logic unit 36, the NOR gate circuit 38 receives the decoded output signals $P_4W_1$, $P_4W_2$, $P_4W_3$ and $P_4W_4$ described above as its four inputs and outputs a low level signal when any of these input signals is at the high level. In other words, when the priority level 4 is set to any of the windows for which address calculation is to be made, the NOR gate circuit 38 outputs the low level signal. Furthermore, the NOR gate circuit 40 receives the decoded output signals $P_3W_1$, $P_3W_2$, $P_3W_3$ and $P_3W_4$ as its four inputs and outputs a low level signal when any of these four input signals is at the high level. In other words, this circuit outputs the low level signal when the priority level 3 is set to any of the windows for which address calculation is to be made.

The inverter 42 outputs the inversion level signal of the output signal of the NOR gate circuit 38 as the priority level designation signal $PR_4$. When the priority level designation signal $PR_4$ is at the high level, it means that the window to be displayed has the priority level 4. The NOR gate circuit 44 receives the inversion level signal of the output signal of the NOR gate circuit 38 described above and the normal level signal of the output signal of the NOR gate circuit 40 as its two inputs and the inverter 46 outputs the normal level signal of the output signal of the NOR gate circuit 44 as the priority level designation signal $PR_3$. When the priority level designation signal $PR_3$ is at the high level, it means that the window to be displayed has the priority level 3. The condition that the output of the NOR gate 44 turns to the high level is that the output of the NOR gate circuit 38 is at the high level and the output of the NOR gate circuit 40 is at the low level. In other words, start of calculation is instructed for any of the windows which are set as the priority level 3 and start of calculation is not instructed for any of the windows set as the priority level 4. Therefore, when start of calculation is instructed for any of the windows set as the priority level 3 and start of calculation is also instructed for any of the windows set as the priority level 4, the priority level designation signal $PR_4$ is turned to the high level only for the priority level 4 having higher priority and the priority level designation signal $PR_3$ is turned to the low level.

In the logic unit 36 described above, the NAND gate circuit 48, which receives as its two input the normal level signal of the output of the NOR gate circuit 38 and the normal level signal of the NOR gate circuit 40, instructs to select the priority level 3 or the priority level 4 in accordance with the high level output.

In the logic unit 36, the NOR gate circuit 50 receives as its four input the decoded output signals $P_2W_1$, $P_2W_2$, $P_2W_3$ and $P_2W_4$ and outputs the low level when any of these input signals is at the high level. In other words, this circuit outputs the low level signal when the priority level 2 is set to any of the windows for which address calculation is to be made. The NOR gate circuit 52 receives as its four inputs the decoded output signals $P_1W_1$, $P_1W_2$, $P_1W_3$ and $P_1W_4$ and outputs the low level signal when any of these input signals is at the high level. In other words, this circuit outputs the low level signal when the priority level 1 is set to any of the windows for which address calculation is to be made. The NOR gate circuit 54 receives as its two input the output signal of the NAND gate circuit 48 and the normal level signal of the output signal of the NOR gate circuit 50, and the inverter 56 outputs the normal level signal of the output signal of the NOR gate circuit 54 as the priority level designation signal $PR_2$. When the priority level designation signal $PR_2$ is at the high level, it means that the window to be displayed has the priority level 2.

The NOR gate circuit 58 receives as its three inputs the inversion level signal of the output signal of the NOR gate circuit 50, the normal level signal of the output signal of the NOR gate 52 and the output signal of the NAND gate circuit 48, and the inverter 60 outputs the normal level signal of the output signal of the NOR gate circuit 58 as the priority level designation signal $PR_1$. When this priority level designation signal $PR_1$ is at the high level, it means that the window to be displayed has the priority level 1. The condition that the output of the NOR gate 54 turns to the high level is that the output of the NAND gate circuit 48 is at the low level and the output of the NOR gate circuit 50 is at the low level. In other words, start of calculation is instructed for any of the windows which are set as the priority level 2 and is not instructed for any of the windows having the priority level 4 or 3. Therefore, only in such a case, the priority level designation signal $PR_2$ having lower priority than the priority level 3 or 4 is turned to the high level.

On the other hand, the condition that the output of the NOR gate circuit 58 turns to the high level is that the output of the NAND gate circuit 48 is at the low level, the output of the NOR gate circuit 50 is at the high level and the output of the NOR gate circuit 52 is at the low level. In other words, the condition means that under the state where start of calculation is not instructed for any of the windows of the priority level 4 or 3, start of calculation is instructed for any of the windows set as the priority level 1 and start of calculation is not instructed for any of the windows having the priority level 2. Therefore, the priority level designation signal $PR_1$ as to the priority level 1 is turned to the high level only when start of calculation is instructed for only any of the windows set as the priority level 1 having the lowest priority.

Though not particularly limitative, the priority level designation signals $PR_1$, $PR_2$, $PR_3$ and $PR_4$ are converted and outputted to the three-bit priority level data $PRN_0$, $PRN_1$, $PRN_2$ through the decoding unit 62 shown in FIG. 4(B). Here, in accordance with the logic of the decoding unit 62, the state where $PRN_0$, $PRN_1$ and $PRN_2$ are "1", "1" and "0" means the priority level 4, when they are "0", "0" and "1", it means the priority level 3 and when they are "1", "0" and "1", it means the priority level 2. When they are "0", "1" and "1", it means the priority level 1.

In FIG. 4(B), reference numeral 64 represents a decoding unit which generates address output gate control signals $C_1 \sim C_4$ on the basis of the output signal of the decoding unit 18 described above and the output signal of the logic unit 36. This decoding unit 64 makes output control of the display address corresponding to the window having the highest priority among the windows for which start of calculation of the window address is instructed.

This decoding unit 64 includes an AND gate array 66 consisting of eight two-input type AND gate circuits and a NOR gate array 76 consisting of NOR gate circuits 68, 70, 72, and 74 receiving sequentially as their two-inputs the output signals of the AND gate circuits contained in the AND gate array 66. The decoded output signals $P_3W_1$, $P_4W_1$, $P_3W_2$, $P_4W_2$, $P_3W_3$, $P_4W_3$, $P_3W_4$ and $P_4W_4$ are supplied to one of the input terminals of each AND gate circuit contained in the AND gate array 66, and the priority level designation signals $PR_3$ and $PR_4$ are supplied to the other input terminal. Therefore, the NOR gate circuit 68 is at the low level when the window 1 which is set as the priority level 3 or 4 among the windows for which start of window address calculation is instructed has the highest priority level, and the NOR gate circuit 70 is at the low level when the window 2 which is set as the priority level 3 or 4 among the windows for which start of window address calculation is instructed has the highest priority level. The NOR gate circuit 72 is at the low level when the window 3 set as the priority level 3 or 4 among the windows for which start of window address calculation is instructed has the highest priority level and the NOR gate 74 is at the low level when the window 4 set as the priority level 3 or 4 among the windows for which start of window address calculation is instructed has the highest priority level.

Similarly, the decoding unit 64 described above includes an AND gate array 78 consisting of eight two-input type AND gate circuits and a NOR gate array 88 consisting of NOR gate circuits 80, 82, 84 and 86 receiving sequentially at their two-inputs the output signals of the AND gate circuits contained in the AND gate array 78. The decoded output signals $P_1W_1$, $P_2W_1$, $P_1W_2$, $P_2W_2$, $P_1W_3$, $P_2W_3$, $P_1W_4$ and $P_2W_4$ are supplied to one of the input terminals of the AND gate circuits contained in the AND gate array 78 and the priority level designation signals $PR_1$ and $PR_2$ are supplied to the other input terminals. Therefore, the NOR gate circuit 80 is at the low level when the window 1 set as the priority level 1 or 2 among the windows for which start of window address calculation is instructed has the highest priority level and the NOR gate circuit 82 is at the low level when the window 2 set as the priority level 1 or 2 among the windows for which start of window address calculation is instructed has the highest priority level. The NOR gate circuit 84 is at the low level when the window 3 set as the priority level 1 or 2 among the windows for which start of window address calculation is instructed has the highest priority level, and the NOR gate circuit 86 is at the low level when the window 4 set as the priority level 1 or 2 among the windows for which start of window address calculation is instructed has the highest priority level.

In the decoding unit 64 described above, the NAND gate circuit 90 generates an address output gate control signal $C_1$ for the window 1 by receiving as its two-input the outputs of the NOR gate circuits 68 and 80 described above, and the NAND gate circuit 92 generates the address output gate control signal $C_2$ for the window 2 by receiving as its two-input the outputs of the NOR gate circuits 70 and 82. The NAND gate circuit 94 generates the address output gate control signal $C_3$ by receiving as its two-input the outputs of the NOR gate circuits 72 and 84 and the NAND gate circuit 96 generates the address output gate control signal $C_4$ for the window 4 by receiving as its two-input the outputs of the NOR gate circuits 74 and 86.

Here, setting of a plurality of window numbers to the priority registers $PRG_1$ ~ $PRG_4$ is not permitted and the priority level designation signals $PR_1$, $PR_2$, $PR_3$ and $PR_4$ generated in the logic unit 36 are not set to the high level simultaneously. Therefore, among the outputs of the NOR gate circuits 68, 70, 72, 74, 80, 82, 84 and 86 described above, only one of them is always controlled to be at the low level in connection with the priority level even when start of address calculation is instructed simultaneously for a plurality of windows, so that only the address output gate control signal of the window corresponding to the low level output is controlled to be at the active level such as the high level and outputs the display address for that window.

In FIG. 4(B), reference numeral 98 represents a decoding unit which generates the 3-bit data $BWD_0$, $BWD_1$ and $BWD_2$ described above corresponding to the window number of the display address on the output of the NAND gate circuits 90, 92, 94 and 96. In accordance with the logic of this decoding unit 98, the state where the address output gate control signal $C_1$ corresponding to the window 1 is at the high level, it means the data BWD0, $BWD_1$ and $BWD_2$ are "0", "1" and "1" representing the window 1 and when the address output gate control signal $C_2$ corresponding to the window 2 is at the high level, the data $BWD_0$, $BWD_1$ and $BWD_2$ are "1", "0" and "1" representing the window 2. When the address output gate control signal $C_3$ corresponding to the window 3 is at the high level, the data $BWD_0$, $BWD_1$ and $BWD_2$ are "0", "0" and "1" representing the window 3 and when the address output gate control signal $C_4$ corresponding to the window 4 is at the high level, the data $BWD_0$, $BWD_1$ and $BWD_2$ are "1", "1" and "0" representing the window 4. When all the address output gate control signals $C_1$ to $C_4$ are at the low level, the data $BWD_0$, $BWD_1$ and $BWD_2$ are "1", "1" and "1" not representing the window display.

In the constructions shown in FIGS. 4(A) and 4(B), various clocked inverter arrays 20, 26, 34, 122, 124, 126, 128, 130 and 132 are disposed in order to define the output timings of the address output gate control signals, the window numbers and the priority levels in connection with the next stage and to prevent racing due to the delay of the gate circuits. These clocked inverter arrays are controlled by clock signals CLK1, CLK2 and $\overline{\mathbf{CLK1}}$, $\overline{\mathbf{CLK2}}$ that overlap with one another and though not particularly limitative, the change of each clock signal from the low level to the high level is used as the output timing. In other words, when the clock signal $\overline{\mathbf{CLK2}}$ changes to the high level, the window number data set in each priority register PRG1 ~ PRG4 is outputted through the clocked inverter array 20 and at the same time, the calculation start designation signal ST1 ~ ST4 is outputted, too. Then, sixteen kinds of the decoded output signals $P_3W_1$, $P_4W_1$, $P_3W_2$, $P_4W_2$, $P_3W_3$, $P_4W_3$, $P_3W_4$, $P_4W_4$, $P_1W_1$, $P_2W_1$, $P_1W_2$, $P_2W_2$, $P_1W_3$, $P_2W_3$, $P_1W_4$ and $P_2W_4$ are outputted from the inverter arrays 26 and 34 in response to the change of the clock signal CLK1 to the high level. The signal is outputted from the inverter array 122 in response to the change of the clock signal CLK 2 to the high level and then the signals are outputted from the clocked inverter arrays 124, 126, 128 and 130 in response to the change of the clock signal $\overline{\mathbf{CLK1}}$ to the high level. Furthermore, the next window number data and the calculation start signals $ST_1$ to $ST_4$ are taken into in response to the change of the clock signal $\overline{\mathbf{CLK2}}$ to the high level and the address output gate control signal, the window number data and the priority level data are outputted from the clocked inverter array 132 on the basis of the signals that are taken into in response to the change of the clock signal $\overline{\mathbf{CLK2}}$ of one previous cycle to the high level.

Next, in the construction shown in FIGS. 4(A) and 4(B), the operation when a plurality of windows overlap will be described. For example, under the state where the priority level 1 is set to the window 3, the priority level 2 is set to the window 4, the priority level 3 is set to the window 1 and the priority level 4 is set to the window 2, if the windows 1, 3 and 4 overlap with one another, three address calculation start signals $ST_1$, $ST_3$ and $ST_4$ are all at the low level. Then, the decoded output signals $P_3W_1$, $P_1W_3$ and $P_2W_4$ are at the high level and the output signals of the three NOR gate circuits 40, 50 and 52 are controlled to the low level. At this time, the logic unit 36 described above controls only the priority level designation signal $PR_3$ having the highest priority among the priority set to the three windows 1, and 4 to the high level and outputs it so that the decoding unit 62 described above outputs the 3-bit data $PRN_0$, $PRN_1$ and $PRN_2$ through the combination of the levels corresponding to the priority level 3. On the other hand, in the decoding unit 64 to which the high level priority level designation signal $PR_3$ is supplied from the logic unit 36, the output of only one NOR gate circuit 68 among the NOR gate circuits contained in the NOR gate arrays 76 and 88 is controlled to the low level, so that the address output gate control signal $C_1$ instructing the output of the display address corresponding to the window 1, to which the highest priority is set among the three windows 1, 3 and 4 having mutually overlap portions, is controlled to the high level. At this time, the decoding unit 98 outputs the 3-bit window number data $BWD_0$, $BWD_1$ and $BWD_2$ through the combination of levels corresponding to the window number 1 of the display address.

Next, an example of the circuit construction containing the address arithmetic units $WAL_1 \sim WAL_n$ and output gates $G_1 \sim G_n$ described above will be explained with reference to FIG. 5.

Figure 5:
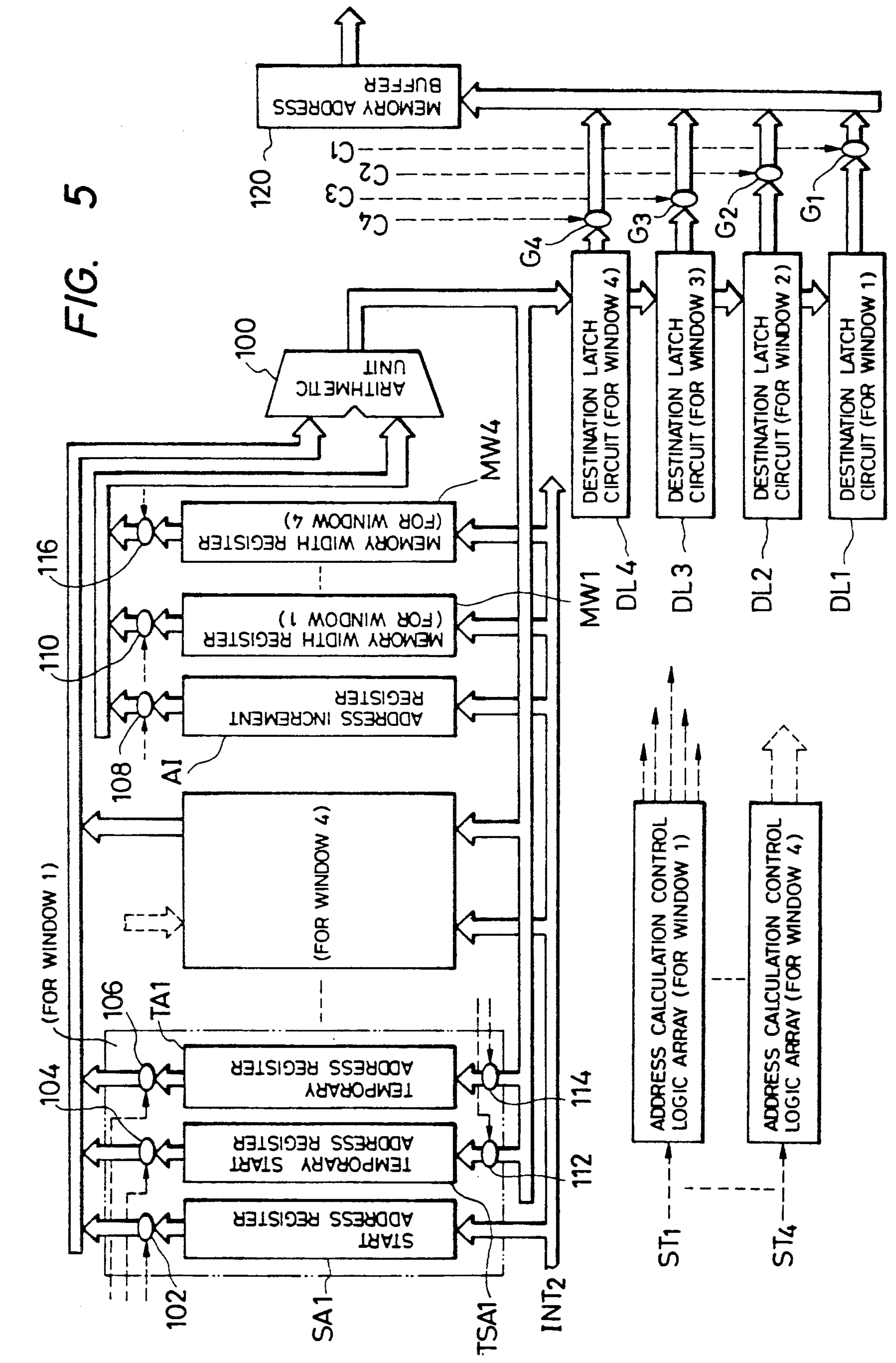
FIG. 5 shows one example of the address arithmetic unit shown in FIG. 1.

The circuit construction shown in FIG. 5 corresponds to the constructions shown in FIGS. 4(A) and 4(B) and is applied to a system which displays and controls a maximum of four windows on a display surface. Though the address arithmetic units $WAL_1 \sim WAL_n$ are shown as different functional blocks in FIG. 1, the construction using one arithmetic unit 100 is shown in FIG. 5.

In FIG. 5, there are shown disposed a start address register SA1 which stores the address data corresponding to the start display address of the window 1 as he display address arithmetic register for the window 1, a temporary start address register TSA1 for storing the start display address in the present raster of the window 1, a temporary address register TA1 for storing the present display address of the window 1, a memory width register MW1 for storing the address number in the horizontal direction in the logic address space of the window 1 and an address increment register PAI for storing the address increment number in the horizontal direction for all the windows. The address increment register PAI is common to all the windows, and these start address register, temporary start address register, temporary address register and memory width register are disposed for the other windows 2 to 4.

The data supplied from CPU through the I/O interface circuit $INT_2$ are set initially to the start address registers SA1, . . . , the memory width registers MW1, . . . and the address increment register PAI. The content of the other temporary start address registers TSA1, . . . and the temporary address registers TA1, . . . is updated sequentially in accordance with the result of calculation by the arithmetic unit 100.

The output terminals of the start address register SA1, temporary start address register TSA1 and temporary address register TA1 are coupled to one of the input terminals of the arithmetic unit 100 through the gates 102, 104 and 106, and the output terminals of the memory width register MW1 and address increment register PAI are connected to the other input terminal of the arithmetic unit 100 through the gates 108 and 110. The output terminal of the arithmetic unit 100 is coupled to the destination latch circuits DL4, DL3, DL2, DL1 which shift and latch the input data, and to the input terminals of the temporary start address register TSA1 and temporary address register TA1 through the gates 112 and 114. Each display address calculation register for the window 2 ~ 4 has the same relation of connection as described above. Incidentally, reference numeral 116 represents the gate for the memory width register MW4 for the window 4.

In FIG. 5, reference numeral 118 represents a logic for the address calculation control of the window 1. This logic generates the control signals for open/close control of the gates 102, 104, 106, 108, 110, 112, 114 at predetermined timings by the calculation start designation signal ST1 described above. Similar address calculation control logic arrays are disposed for the windows 2 to 4, too. Incidentally, reference numeral 120 in FIG. 5 presents the address calculation control logic array for the window 4.

Here, the calculation sequence of the display address will be explained. The display address for the window 1 is calculated, for example, in the following way. When the start of calculation of the display address is instructed to the address calculation control logic array 118 by the calculation designation signal $ST_1$, the gate 102 is first opened and the leading address data of the window 1 stored in the start address register SA1 is used as the display address through the arithmetic unit 100 which is under the non-operation state. At this time, the leading address data outputted through the arithmetic unit 100 is stored in the temporary start address register TSA1 and the temporary address register TA1 through the gates 112 and 114 that are controlled to the ON state. At the next calculation timing, the stored data of the temporary address register TA1 and the print address increment register PAI are added by the arithmetic unit 100 and is used as the display address. The result of calculation at this time is stored in the temporary address register TA1.

Such a calculation sequence is continued so long as the display position is at the same raster in the window 1. Next, when the horizontal position is changed to the next raster, the address data stored in the temporary start address register TSA1 and the stored data of the memory width register MW1 are added by the arithmetic unit 100 and the addition result data is used as the leading display address of the raster. This address data is stored in the temporary start address register TSA1 and the temporary address register TA1 through the gates 112 and 114 that are controlled to the ON state. At the next timing, the stored data of the temporary address register TA1 and the stored data of the address increment register PAI are added by the arithmetic unit 100 and is used as the next display address. This display address data is stored in the temporary address register TA1. Thereafter, each display address of the window 1 is sequentially calculated in the same way as described above. Such a calculation sequence is continued so long as the display position is in the same raster in the window 1. Next, when the horizontal display position is changed to the next raster, the address data stored in the temporary start address register TSA1 and the stored data of the memory width register MW1 are added by the arithmetic unit 100 and the addition result data is used as the leading display address in that raster. This address data is stored in the temporary start address register TSA1 and the temporary address register TA1 through the gates 112 and 114 that are controlled to the ON state.

At the next display timing, the stored data of the temporary address register TA1 and the stored data of the address increment register PAI are added by the arithmetic unit 100 and the addition result data is used as the next display address. This display address data is stored in the temporary address register TA1. Thereafter, each display address of the window 1 is sequentially calculated in the same way as described above.

Though not particularly limitative, the construction shown in FIG. 5 can calculate sequentially and time-divisionally the display addresses of from window 1 to window 4 in one memory cycle of a frame buffer, not shown. Therefore, the output data of the arithmetic unit 100 is sequentially shifted in one memory cycle and latched from the destination latch circuit DL4 to DL1.

At this time, the display address is latched by the destination latch circuit corresponding to the window for which calculation of the display address is instructed by the calculation start designation signal $ST_1 \sim ST_4$. In other words, the display addresses for maximum four windows are latched every one memory cycle.

The address data latched by the destination latch circuit DL1 ~ DL4 every one memory cycle is supplied to the memory address buffer 122 through one of the output gates $G_1$ to $G_4$ that are controlled on the basis of the address output gate control signals $C_1$ to $C_4$ and the address data is outputted as the display address to the frame buffer not shown.

The present invention described above provides the following effects.

(1) The present invention disposes the window management circuits having the registers for setting the display start position and end position on the display surface and the address comparators in the same number as the number of windows that are to be controlled under their own management and the address calculation circuits in order to make it possible to make address calculation for each window. The present invention includes also the window control circuit (window display priority designation circuit) including the register for setting the priority of each window, judging the priority on the basis of the content of this register and generating the control signal for outputting the address corresponding to the window having the highest priority among the addresses that are calculated by the address calculation circuit. Therefore, the present invention provides the effect that the display position of the window, its size and display content and the display priority sequence at the overlap portion can be changed arbitrarily by merely changing the set content of the register.

(2) When multi-window display control is made, the present invention does not need the processing of transferring the data of each window area by the bit block transfer system and rewriting the base picture area, but can supply directly the address of a predetermined window data to the frame buffer in accordance with the display priority sequence set in advance programmably.

(3) Due to the effects described above, the present invention can improve freedom of the display surface and moreover can make multi-window control at a higher speed.

Though the present invention has thus been described definitely with reference to the preferred embodiments thereof, it is not particularly limited thereto but can of course be changed or modified in various manners without departing from the spirit and scope thereof. For example, in the embodiment given above, only the window display is explained without mentioning at all the display of the background, but it is possible to make desired window display control by regarding the display surface as a whole as one window, giving the lowest priority level, to the background to regard it as the background surface and displaying the window which is smaller than and has higher priority than the former on the background surface.

In place of the priority registers $PRG_l$ to $PRG_n$, window number registers for setting the display priority level in the sequence of the window number can be employed.

In the embodiment given above, the display controller can output the priority level and the window number but these status signals need not always be outputted to the outside.

In the embodiment given above, further, address calculation is made for each of the windows which are judged as containing the display position in connection with the output of the display address of the window which is judged as having high priority when making the multi-window display control, and the result of calculation having the highest priority is selectively outputted to the frame buffer through the output gate. However, it may be possible, too, to selectively execute the address calculation of the data corresponding to the window which is judged as having the highest priority and to supply the result of calculation as the display address to the frame buffer.

Though the description given above deals primarily with the application of the present apparatus to the display controller as the field of utilization thereof, the present invention is not particularly limited thereto but can be utilized, too, for a control apparatus for reading and writing the data from and to a memory in a laser beam printer, for example.

What is claimed is:

1. A display control apparatus comprising:

priority setting means for setting programmably display priority to a plurality of window display areas on a display area, wherein said priority setting means includes a plurality of priority setting registers for setting a predetermined display priority for each of said windows;

display address generating means including a plurality of width setting means for setting programmably a predetermined memory width for each of said windows, wherein said display address generating means generates a display address having said predetermined memory width for each of said widows; and means for determining which window is to be displayed on said display area, on the basis of priority set by said priority setting means.

2. A display control apparatus according to claim 1, wherein said determining means includes:

first means for determining which windows contain a present display position on said display area in the display area thereof; and second means for determining which window has the highest priority among windows which are designated by said first means as containing present display position.

3. A display control apparatus according to claim 2, wherein said second means includes decoding means for decoding signals supplied from said priority setting registers and a signal supplied from said first means, wherein said decoding means selects the window having the highest priority among those windows which are designated by said first means.

4. A display control apparatus according to claim 3, which further, includes a plurality of area setting means for setting programmably a plurality of window display areas on said display area.

5. A display control apparatus according to claim 4, wherein said area setting means includes registers for setting display start and end positions of said window on said display area.

6. A display control apparatus according to claim 5, wherein said first means includes counting means for representing the present display position on said display area and comparision means for comparing the count value of said counting means with a set value of said register for setting said display start and end positions, and said comparison means outputs a signal representing said window containing the present display position on said display area.

7. A display control apparatus according to claim 6, wherein each of said width setting means includes a register for setting a memory width.

8. A display control apparatus according to claim 7, wherein said width setting means receive predetermined data from a central processing unit to set said predetermined memory widths to the setting registers.

9. A display control apparatus according to claim 8, wherein said display address generated by said display address generating means is provided to a frame buffer, and wherein said width setting means programmably sets the predetermined memory width for each of said windows as a memory width within the frame buffer.

10. A display control apparatus according to claim 1, wherein said display address generated by said display address generating means is provided to a frame buffer, and wherein said width setting means programmably sets the predetermined memory width for each of said windows as a memory width within the frame buffer.

11. A display control apparatus comprising:

calculation means including a plurality of width setting means for setting programmably a predetermined memory width for each of a plurality of windows, wherein said calculation means calculates display addresses which are defined by the set predetermined memory width for the plurality of windows on a display area;

priority setting means capable of setting programmably a predetermined display priority for a plurality of window display ares; and control means for selectively outputting a display address of a window which is to be displayed on the basis of priority set by said priority setting means.

12. A display control apparatus according to claim 11, wherein said control means includes means for determining which windows contain the present display position on said display area and output control means for outputting and controlling the display address corresponding to a window having the highest priority among windows which are designated by said determining means as containing the present display position.

13. A display control apparatus according to claim 12, wherein said determining means includes a signal instructing calculation of the addresses for windows which are determined as containing the present display position to said calculation means, and wherein said control means has a signal for outputting a result of calculation by said calculation means which corresponds to the window having the highest priority among the results of calculation made by said calculation means.

14. A display control apparatus according to claim 13, wherein said priority setting means includes a plurality of priority setting registers for setting a display priority of each window, a plurality of said priority setting registers having a sequence of display priority, respectively, and wherein identification information corresponding to each of said windows is set to each of said priority setting registers.

15. A display control apparatus according to claim 14, which further includes a plurality of area setting means capable of setting programmably a plurality of window display areas on said display area.

16. A display control apparatus according to claim 15, wherein said area setting means includes registers for setting display start and end positions of said window on said display area.

17. A display control apparatus according to claim 16, wherein said determining means includes counting means for representing the present display position on said display area and comparison means for comparing the count value of said counting means with a set value of said register for setting the display start and wherein end positions, and said comparison means outputs a signal for representing said window containing the present display position on said display area.

18. A display control apparatus according to claim 17, wherein each of said width setting means includes a register for setting a memory width.

19. A display control apparatus according to claim 18, wherein said width setting means receive data from a central processing unit to set said predetermined memory widths to the setting registers.

20. A display control apparatus according to claim 19, wherein said display addresses calculated by said calculation means are provided to a frame buffer, and wherein said width setting means programmably sets the predetermined memory width for each of said windows as a memory width within the frame buffer.

21. A display control apparatus according to claim 15, wherein said area setting means and said priority setting means receive predetermined data from a central processing unit.

22. A display control apparatus according to claim 11, wherein said display addresses calculated by said calculation means are provided to a frame buffer, and wherein said width setting means programmably sets the predetermined memory width for each of said windows as a memory width within the frame buffer.

* * * * *